Nov. 11, 1930.                I. W. REYNOLDS                1,781,246
                            MEASURING INSTRUMENT
                            Filed Aug. 27, 1927
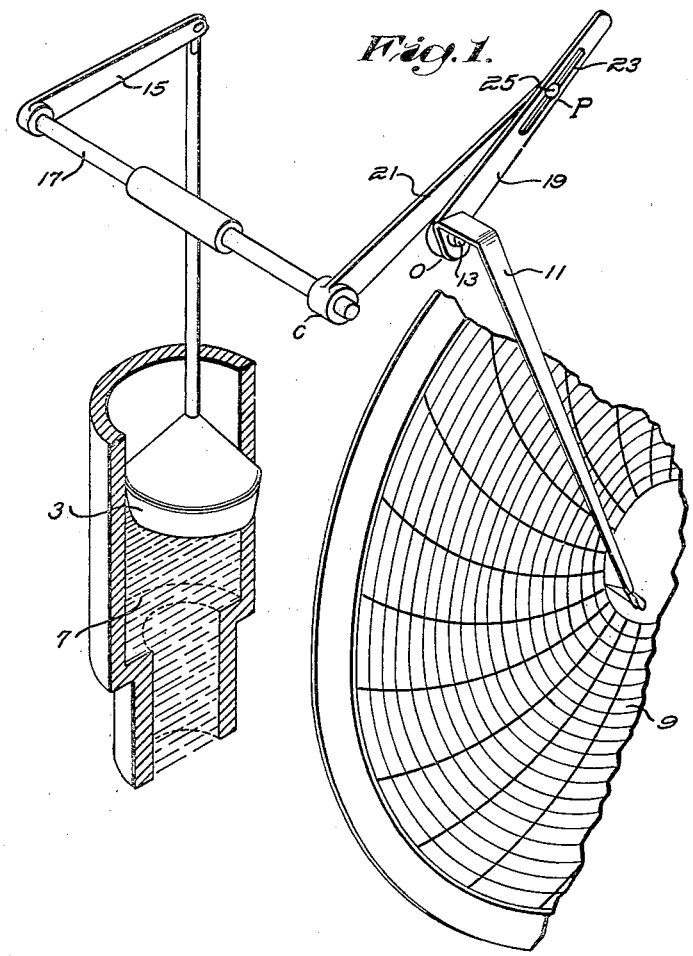
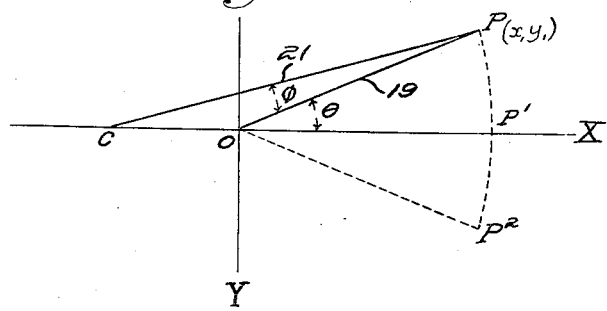
Inventor;
Irving W. Reynolds, Patented Nov. 11, 1930

1,781,246

UNITED STATES PATENT OFFICE

IRVING W. REYNOLDS, OF FOXBORO, MASSACHUSETTS, ASSIGNOR TO THE FOXBORO COMPANY, OF FOXBORO, MASSACHUSETTS, A CORPORATION OF MASSACHUSETTS

MEASURING INSTRUMENT

Application filed August 27, 1927. Serial No. 215,929.

This invention relates to measuring instruments which are responsive to the fluctuations of some variable and in particular to those in which the responsive mechanism moves linearly in accordance with the changes in value of the variable. The object of the invention is to provide in such an instrument, wherein it is desired to transmit the movement of the responsive mechanism to a rotating shaft or arm, suitable means whereby the angular movement of the driven element is proportional to the linear movement of the measuring device.

My invention will be well understood by reference to the following description of an illustrative example thereof taken in connection with the accompanying drawings, wherein:

Fig. 1 is a fragmentary broken perspective of a recording pressure gage of the float type; and Fig. 2 is a mathematical diagram.

A recording pressure gage is a familiar example of measuring instrument in connection with which I have chosen to illustrate my invention, although it will be understood that the invention is applicable also to indicating and controlling instruments. I have herein shown a gage of the type commonly used in connection with orifice meters in which a metal float 3 rests in a body of mercury in a well 7 and reciprocates vertically in accordance with changes in the level of the mercury corresponding to variations in pressure to which it is subjected. It will be understood that the movement of the float 3 is directly proportional to the pressures. The pressures are recorded upon a suitable rotating polar chart 9 by means of a pen 11 swinging on a shaft or center 13 adjacent the periphery of the chart. The linear movement of the float is most conveniently transformed to rotative movement by permitting the float to act upon a crank 15 on a shaft 17. It will be obvious, however, that the linear movement of the float is proportional to the sines of the angle of displacement of the shaft 17 and if the shaft 17 were used as a pen shaft, as in the common type of instrument, equal increments of movement of the float corresponding to equal increments of pressure would not produce equal movements of the pen. In accordance with my invention I provide a suitable linkage between the crank driven shaft and the pen shaft whereby movement of the pen is proportional to the movement of the float, that is, with sufficient accuracy for commercial purposes.

In the embodiment of the invention shown in Fig. 1 the pen shaft 13 is disposed in horizontal alignment with the shaft 17 and is rotated by means of an arm 19 in fixed angular relation to the pen arm 11. The arm is driven by means of a lever 21 on the shaft 17 so proportioned that the angular movement of arm 19 is approximately in fixed ratio to the linear movement of the float 3 throughout the range of the instrument, and indeed it is exactly equal thereto at points near the extremes of movement of the pen and at an intermediate point, as will be clear from what follows. Since as the lever 21 swings its end is at a variable distance from the fixed center 13 of the pen arm, provision must be made to compensate for this variation in distance and in the present instance the arm 19 is fixed on shaft 13 and is provided with a slot 23 in which slides a pin 25 on lever 21. The linkage shown is some times known as a pin and slotted crank and sometimes as a turning block linkage. It will be understood that the lever 21 in practice swings through a relatively limited arc, say about 45°.

Of course this assumed arc of about 45° is merely an example of one practical range for the instrument, and while I will herein describe the complete derivation of the proportion for the parts for an instrument of substantial accuracy over this range, it will be apparent from the following derivation that other ranges may be provided for with equal facility.

To recapitulate, the vertical movement of the float 3 a given distance will cause the crank system 15, 17, 21 to rotate through an angle having a sine value proportional to that vertical distance. Thus if the arm 21 constitutes the pen carrying arm, the angle moved by this arm for a vertical movement of the float of a given distance would be the angle of which the distance is a sine function. Thus, referring to Fig. 2, movement of the point P from point P' to point $x'\ y'$ (the vertical distance $y$ being of course proportional to the movement of the float) is accompanied by a movement of the arm CP through the angle $\phi$ (i. e. P'CP) according to the formula $$K[\sin \phi] = y$$

where K is the constant of proportionality, the length of arm CP.

According to my invention, I make the angle moved by the arm carrying the pen substantially proportional to the distance $y$ throughout a practical range, rather than an angle whose sine is proportional to the distance $y$, and thus correct for this sine function error, the ideal which I approximate being to have the pen carrying arm swing through an angle $\theta$ proportional to the vertical distance $y$, moved by the point P, i. e. according to the equation of the transcendental curve;

$$K\theta = y$$

$y$ being measured in linear units and $\theta$ being the radian measure of the angle moved by the arm, OP, which carries the pen arm 11.

Now in using the crank system of converting the vertical motion of the float into angular motion, the point P necessarily must travel in a circle about the center of the crank system C, and accordingly to accomplish a close approximation to the ideal equation $y = K\theta$, I locate the point C so that the circle traced by the point P will very nearly coincide with the curve $y = K\theta$, with respect to the center O, throughout the range of the instrument.

As I prefer to have the curve traced by the point P coincide exactly with the transcendental curve $y = K\theta$ at the mid-point and end points of the range of the instrument, I therefore locate the center C so that the circle of radius CP will coincide with the transcendental curve at the point $\theta = O$ and at points on opposite sides of this point corresponding to the desired plus and minus values of $\theta$.

Considering the embodiment of correcting linkage shown, wherein the correction is accomplished by the use of but two centers C and O and two links 21 and 19, the general expression for the relationship between these links for any range of the instrument, may be derived as follows:

(I) Referring to Fig. 2 of the drawing, P indicates any chosen point on the curve $y = K\theta$, and P' is the median point.

(II) From the equation of the transcendental curve, $y = K\theta$ (III) From the right triangle relationship $$x = \frac{y}{\tan \theta} \text{ and } x = OP \cos \theta$$

substituting (II) in (III)

$$x = \frac{K\theta}{\tan \theta} = OP \cos \theta$$

(IV) To determine value of K, the constant; as $\theta$ approaches zero $$\left\{\begin{array}{l} OP \text{ approaches } OP' \\ \theta \text{ and } \tan \theta \text{ approach equality} \\ \cos \theta \text{ approaches } 1.0000 \end{array}\right\}$$

thus Equation (III), for extremely small angles, becomes $x = K = 1(OP')$, thus determining the value of K to be (OP').

(V) To summarize:

$$y = \theta(K), \text{ or } \theta(OP')$$

and $$x = \frac{\theta K}{\tan \theta}, \text{ or } \frac{\theta(OP')}{\tan \theta}$$

(VI) Considering the right triangle having the hypothenuse CP, from the relationship of the sides of a right triangle:—

$$(CO + x)^2 + (y)^2 = (CP)^2$$

(VII) But alignment of C, O and P shows that $CP = CO + OP'$ or by derivation, when $\theta = O$, $x = K$ (i. e. $OP'$), and $y = O$ whence from (VI)

$$(CO + K)^2 + (O)^2 = (CP)^2$$

whence $$CO + K = CP$$
$$CO + OP' = CP$$

or (VIII) substituting (VII) in (VI)

$$(CO + x^2) + (y)^2 = (CO + OP')^2$$

(IX) For simplicity I will use K, shown in step (IV) to be OP', in lieu thereof, and write this equation $$(CO + x)^2 + (y)^2 = (CO + K)^2$$

(X) Expanding $$(CO)^2 + 2CO \cdot x + x^2 + y^2 = (CO)^2 + 2CO \cdot K + K^2$$

(XI) Subtracting $(CO)^2$ from each side and transposing $$2CO \cdot x - 2CO \cdot K = K^2 - x^2 - y^2$$

whence $$2CO = \frac{K^2 - x^2 - y^2}{x - K}$$

(XII$^a$) Substituting for $x$ and $y$, their K-values from (V)

$$2CO = \left[\frac{K^2 - \frac{\theta^2 K^2}{\tan^2\theta} - \theta^2 K^2}{\frac{\theta K}{\tan\theta} - K}\right]$$

whence $$2CO = K\left[\frac{1 - \frac{\theta^2}{\tan^2\theta} - \theta^2}{\frac{\theta}{\tan\theta} - 1}\right]$$

which is a general expression for the relation between CO and K (i. e. OP′) for coincidence of the circle radius CP with the transcendental curve $y = K\theta$ at any angle $\theta$ desired. Noting from (VII) that $CP = CO + OP' = CO + K$, it becomes apparent that the two equations (VII) and (XII$^a$) are the only equations necessary to solve this problem generically for any range of $\theta$, for a single pair of bars CP and OP slidably connected at P.

(XIII) Now completing the specific illustration suppose a range of approximately 45° is desired, i. e. about .8 radians between the points of coincidence +P and −P. For these conditions the circle of radius CP must pass through the point P′ (where $\theta = 0$) and must also intersect the transcendental curve $y = K\theta$ at $\theta = \pm .4$ radians.

(XIV) From the tables of natural functions $$\tan .4 \text{ radians} = .4228$$

(XV) Substituting the values of $\theta$ and $\tan\theta$ in (XII$^a$)

$$2CO = K\left[\frac{1 - \frac{(.4)^2}{(.4228)^2} - (.4)^2}{\frac{.4}{.4228} - 1}\right]$$

(XVI) And solving for CO in terms of K $$CO = K(0.511)$$

whence from equation (VII), it becomes apparent that the ratios of the links for a range having coincidence at $\theta = 0$, and $\theta = \pm .4$ radians, will be $$CO = 0.511(OP')$$
$$CP = CO + (OP') =$$
$$(0.511 + 1.00)(OP') = 1.511(OP')$$

(XII$^b$) To vary the effect of normally insignificant figures in the value of the natural tangent, the Equation (XII$^a$) may be differently expressed by resorting to common denominators and dividing, which gives an alternative form of the general equation:

$$2CO = K\left[\frac{\tan^2\theta - \theta^2(1 + \tan^2\theta)}{\tan\theta(\theta - \tan\theta)}\right]$$

(XV$^b$) The same values of $\theta$ and $\tan\theta$ in this form of the equation (i. e. XII$^b$), give $$2CO = K\left[\frac{(.4228)^2 - .16(1 + [.4228]^2)}{(.4228)(.4 - .4228)}\right]$$

(XVI$^b$) And solving for CO in terms of K $$CO = K(.51035+)$$

which shows that the insignificant figures of the value for the tangent may make a difference of several ten-thousandths in the ratio, depending upon the manner of expressing the equation.

(XVII) Thus we may take CO as either of the values (XVI$^a$) or (XVI$^b$), or as the average thereof, about .5107 (K), which for all practical purposes equals .511 (K), i. e. .511 (OP′).

(XVIII) Similarly by using a value of $\theta$ corresponding to any desired range of the instrument and the natural tangent of that value of $\theta$ in equation (XII$^a$) or (XII$^b$), the radius CP of a circle to coincide with the transcendental curve $y = K\theta$ at the chosen plus and minus values of $\theta$, and $\theta = 0$, can be determined, and it will be appreciated that in all cases the effective length of the lever CP, or of a linkage equivalent thereto, will be found to be greater than the spacing of the centers CO.

For a range of 70° or less, i. e. plus and minus values of $\theta$ of .6 radians or less, the deviation of the circular arc from the transcendental curve between the points of coincidence is very small, the percentage of error being so small that for practical purposes the movement of the arm 19 and consequently the movement of the pen may be said to be proportional to the movement of the float 3 throughout the range of the instrument.

It will be understood that when the crank 15 is horizontal the linkage is in its median position and the position of the pin 25 corresponding to P′ in Fig. 2 is colinear with the centers O and C of shafts 13 and 17.

I have described in detail one particular embodiment of my invention whereby by means of a suitable linkage the action of the driving crank 15 is compensated for and the movement of the part by which the action of the instrument is utilized, herein the recording pen 11, is made proportional to the movements of the linearly moving responsive device and consequently to the values of the variable. It is understood that the mechanical example shown is merely illustrative and what I claim as new and desire to secure by Letters Patent I shall express in generic terms in the following claims.

Claims:

1. An instrument of the class described comprising a responsive device having a linear movement; an arm for rendering available the movement of said device pivoted to swing about a fixed center; a second fixed center spaced from said first fixed center and a lever crank driven thereabout by said responsive device, and of greater length than the distance between said fixed centers, and connected to drive said arm.

2. An instrument of the class described, comprising a responsive device having a linear movement; an arm for rendering available the movement of said device mounted to swing about one of two mutually spaced and relatively fixed pivot points; a lever mounted to swing about the other of said pivot points; connecting means comprising a crank driven by said responsive device and in turn driving said lever; a movable connection linking said lever to said arm; the distance from the pivot point of said lever to the point of attachment to said lever of said movable connection being greater than the mutual spacing of said centers whereby to effect angular movement of said arm substantially directly proportional to the linear movement of said responsive device in the range of the instrument.

3. An instrument of the class described comprising a responsive device having a linear movement; an arm for rendering available the movement of said device mounted for angular movement about a center; a second center spaced from said first center and a lever crank driven thereabout by said responsive device, and of greater length than the spacing of said centers, and movable connecting means connecting said lever and arm to drive said arm whereby to effect angular movements of said arm substantially directly proportional to the linear movement of said responsive device in the range of said instrument.

4. In an instrument of the class described a swinging lever mounted on a pivot wherefore any given point on said lever traces an arc of a circle on swinging movement of said lever, an arm mounted on a second pivot spaced from said first named pivot by a distance less than the length of said lever, and movable connecting means linking said arm to said lever at the extremity of said lever remote from its pivot point whereby to effect angular movement of said arm within a predetermined range substantially directly proportional to the sine of the angle moved by said lever in effecting such angular movement.

5. In an instrument of the class described, a pivot point, a lever having two connecting points, one of said connecting points being mounted at said pivot point, a driving means connected at the other of said connecting points, a second pivot point spaced from said first pivot point by a distance less than that between said connecting points on the lever, and an arm swingable about said second pivot and driven by said driving means.

6. An instrument of the class described comprising a responsive device having a linear movement; an arm for rendering available the movement of said device pivoted to swing about a fixed center; a second fixed center spaced from said first fixed center and a lever crank driven thereabout by said responsive device and connected at its end remote from the pivot to drive said arm through a predetermined angular range ($2\theta$) half above and half below the line of said centers, the spacing of said centers (CO) and the length of said lever (CP) being determined by the predetermined angular range ($2\theta$) according to the relationship $$2CO = (CP-CO)\left[\frac{\tan^2 \theta - \theta^2 (1+\tan^2 \theta)}{(\tan \theta)(\theta-\tan \theta)}\right]$$

thereby to effect angular movement of said arm directly proportional to the linear movement of said responsive device at the extremities of the predetermined angular range ($2\theta$) and at the mid-point of said range.

7. In an instrument of the class described a responsive device having a linear movement, a shaft crank-driven thereby, a lever on the shaft, a second shaft the rotation of which renders available the action of said device, a link fast on said second shaft, the distal end of the lever being connected to the link to slide therealong, the distance between said shafts and the length of such lever being approximately in the ratio 1.510 to .510 whereby to produce angular movements of said second shaft approximately proportional to the linear movements of said responsive device throughout the range of the instrument.

8. In a device of the class described, a pair of fixed centers spaced apart a given distance (CO), an arm pivoted at one of said centers to have an angular range ($\theta$) above and below the line of said centers, a lever of fixed length (CP) pivoted at the other of said centers and having a sliding connection with said arm, a responsive device having a linear movement connected to impart to said lever angular movement of which the sine is proportional to said linear movement, the length of said lever (CP) and spacing of said centers (CO) bearing substantially the following relationship:

$$2CO = (CP-CO)\left[\frac{\tan^2 \theta - \theta^2 (1+\tan^2 \theta)}{(\tan \theta)(\theta-\tan \theta)}\right]$$

for the purpose described.

In testimony whereof, I have signed my name to this specification.

IRVING W. REYNOLDS.